US009170985B1

(12) United States Patent
Langhammer

(10) Patent No.: US 9,170,985 B1
(45) Date of Patent: Oct. 27, 2015

(54) BIDIRECTIONAL FAST FOURIER TRANSFORM IN AN INTEGRATED CIRCUIT DEVICE

(71) Applicant: Altera Corporation, San Jose, CA (US)

(72) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 322 days.

(21) Appl. No.: 13/802,505

(22) Filed: Mar. 13, 2013

Related U.S. Application Data

(60) Provisional application No. 61/747,793, filed on Dec. 31, 2012.

(51) Int. Cl.
 G06F 17/14 (2006.01)
(52) U.S. Cl.
 CPC .................................... G06F 17/142 (2013.01)
(58) Field of Classification Search
 None
 See application file for complete search history.

(56) References Cited

U.S. PATENT DOCUMENTS

| 3,702,393 A | * | 11/1972 | Fuss | 708/404 |
| 3,746,848 A | * | 7/1973 | Clary | 708/404 |
| 5,038,311 A | * | 8/1991 | Monastra et al. | 708/406 |
| 5,473,556 A | * | 12/1995 | Aguilar et al. | 708/404 |

* cited by examiner

*Primary Examiner* — David H Malzahn
(74) *Attorney, Agent, or Firm* — Ropes & Gray LLP

(57) ABSTRACT

Methods and systems for performing Fast Fourier Transform (FFT) operations are disclosed. A plurality of cascaded stages compute a selectable one of a forward decimation-in-frequency (DFT) FFT operation in a forward direction from an $i^{th}$ stage to a $j^{th}$ stage, and a reverse DFT FFT operation in a reverse direction from the $j^{th}$ stage to the $i^{th}$ stage. The reduction in time and resource usage from employing the disclosed bidirectional DIF FFT architectures may significantly increase performance of DIF applications, for example, ones that involve streaming FFTs.

23 Claims, 8 Drawing Sheets

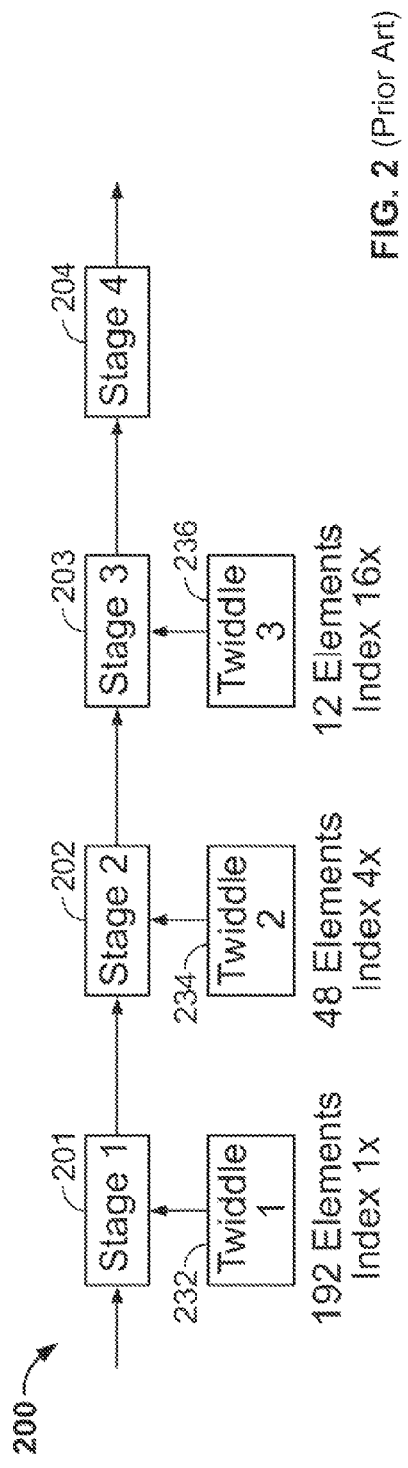
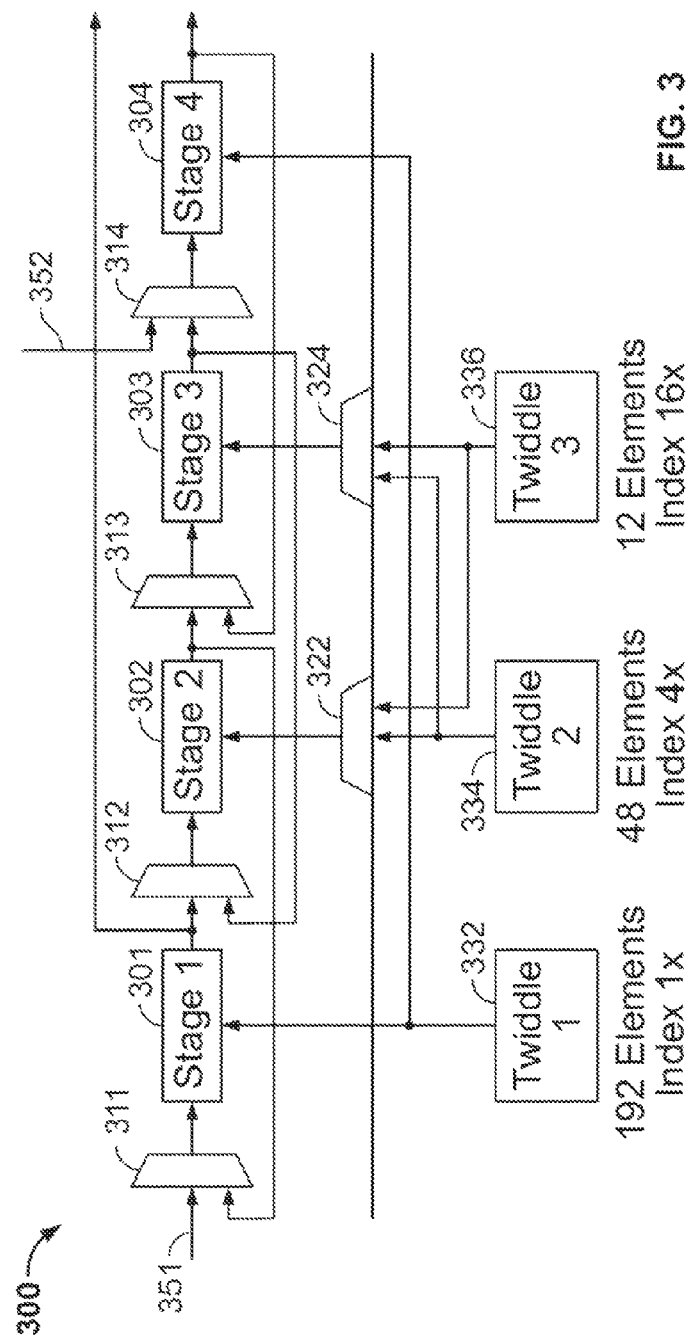
FIG. 2 (Prior Art)
FIG. 3

600

602
Computing a selectable one of a forward FFT operation and a reverse FFT operation using cascaded stages 604
Receiving first data for processing in the cascaded stages in the forward direction 606
Receiving second data for processing in the cascaded stages in the reverse direction

FIG. 6

BIDIRECTIONAL FAST FOURIER TRANSFORM IN AN INTEGRATED CIRCUIT DEVICE

CROSS-REFERENCE TO RELATED APPLICATIONS

This application claims the benefit under 35 U.S.C. §119 (e) of U.S. Provisional Application No. 61/747,793, filed Dec. 31, 2012, which is hereby incorporated by reference herein in its entirety.

FIELD OF THE INVENTION

This disclosure relates to providing Fast Fourier Transform (FFT) architectures in an integrated circuit device, for example, an application-specific standard product (ASSP), an application-specific integrated circuit (ASIC), a programmable logic device (PLD), a field programmable gate array (FPGA), a full-custom chip, or a dedicated chip.

BACKGROUND OF THE INVENTION

An FFT calculation includes reading an input data sequence in the form of time-domain samples x[n], n=0, ..., N−1, where N is the length of the input data sequence, and outputting an FFT data sequence in the form of frequency-domain components X[k], k=0, ..., N−1. Such a calculation is conventionally called an N-point FFT. Some FFT algorithms use a divide and conquer approach to reduce the computational complexity of calculating an FFT. For example, some FFT algorithms recursively decompose the problem of calculating the FFT into two sub-problems of half the size (i.e., N/2) at every intermediate pass. The size of the FFT decomposition is known as the radix. In the above example, the radix is 2. This decomposition approach generally works for any radix k provided that N is a power of k. Thus, calculating an FFT typically involves making a number of passes. These passes may be made over the input data sequence x[n], n=0, ..., N−1 (and intermediate results) in the time domain, in which case the algorithm is a decimation-in-time (DIT) algorithm. Alternatively, the passes may be made over the FFT data sequence X[k], k=0, ..., N−1 (and intermediate results) in the frequency domain, in which case the algorithm is a decimation-in-frequency (DIF) algorithm. In general, each pass can be associated with the same or a different radix. An algorithm using different radix values in different passes is a mixed radix algorithm and may be useful for computing an FFT with irregular sizes (e.g., size that are not a power of 4). For example, a mixed radix 4/2 FFT algorithm may use a radix R=4 in a first stage and R=2 in a second stage.

As an example, consider the calculation of a 64-point FFT using the radix R=4. For computing the FFT, an FFT processor conventionally processes the input data sequence in the order where the indices corresponding to the data samples are arranged in the following order:

00,16,32,48,01,17,33,49,02,18,34,50,03,19,35,51,04,20, 36,52,..., 15,31,47,63. This order of data samples is referred to as a radix-reversed order. In the first pass of the FFT calculation, data samples corresponding to indices 00, 16, 32, and 48 are used to compute a first radix-4 bin; data samples corresponding to indices 01, 17, 33, and 49 are used to compute the next radix-4 bin; and so on. An FFT bin corresponds to a portion of the FFT calculation that breaks up the larger FFT calculation into smaller sub-transform calculations.

Many applications use Decimation-in-Frequency (DIF)—these applications perform an FFT algorithm on time-domain input data, process the FFT data samples, then perform an inverse FFT (IFFT) algorithm to recover time-domain output data. Because it is generally expensive and inefficient to perform FFT and IFFT algorithms on data ordered in natural order, existing applications either reorder the data in radix-reverse order or use decimation-in-time (DIT) algorithms. These solutions suffer from low throughput and high usage of logic and memory resources. These solutions are also incapable of computing certain radix values, such as radix-2 FFT or mixed radix 4/2 FFT.

A known FFT implementation cascades together a series of FFT stages as shown in FIG. 2. The illustrated architecture 200 is a forward radix-4 FFT architecture, and includes four stages 201, 202, 203, and 204 connected in series. Input data is fed into the first stage 201, and the output of each stage 201, 202, and 203 is directly input to subsequent stage 202, 203, and 204, respectively. Processed data is output in radix-reversed order from the last stage 204. Each stage (except the last stage) has its own dedicated twiddle stage generator—i.e., each stage 201, 202, and 203 has its own dedicated twiddle stage generator, 232, 234, and 236, respectively. In addition, each twiddle stage generator is associated with a corresponding twiddle stride for that pass, i.e., the twiddle stride increases by 4 at each stage, so the number of generated twiddle factors also decreases by a factor of 4 at each stage. In the exemplary architecture of FIG. 2, twiddle stage generator 232 generates 192 twiddle factors with a twiddle indexing of 1× for the first stage 201; twiddle stage generator 234 generates 48 twiddle factors with a twiddle indexing of 4× for the second stage 202; and twiddle stage generator 236 generates 12 twiddle factors with a twiddle indexing of 16× for the third stage 203.

The serial architecture of FIG. 2 has many limitations. First, the serial architecture of FIG. 2 is unidirectional, and can only perform FFT operations on data input from left to right. Second, the serial architecture of FIG. 2 can implement FFT operations in only one direction—it can either perform forward (FFT) operations or reverse (IFFT) operations, but not both. Third, each stage in the serial architecture of FIG. 2 is limited to the configuration of its associated twiddle stage generator, and as such can function only in one specific FFT pass in only one direction of the implemented FFT operation. As a result, a DIF application may require having more than one instance of architecture 200 to handle both the FFT and IFFT operations involved. This has several disadvantages, such as lower performance, increased usage, and lower throughput.

SUMMARY OF THE INVENTION

This disclosure relates to providing bidirectional Fast Fourier Transform (FFT) architectures in an integrated circuit device, for example, an application-specific standard product (ASSP), an application-specific integrated circuit (ASIC), a programmable logic device (PLD), a field programmable gate array (FPGA), a full-custom chip, or a dedicated chip.

According to some aspects, a streaming FFT architecture is disclosed, the streaming FFT architecture having one or more of the following features: (1) the streaming FFT architecture is bidirectional, i.e., it can perform FFT operations in a selectable one of a forward or a reverse FFT direction; (2) the streaming FFT architecture can accept and process input data arranged in a natural and/or a radix reversed order; (3) the streaming FFT architecture may process mixed-radix forward and/or reverse FFT operations with an optimal twiddle memory usage; and/or (4) the streaming FFT architecture may process forward and/or reverse FFT operations with an optimal delay memory usage. In some implementations, the optimal twiddle memory usage and optimal delay memory usage may correspond to a most optimal usage. According to some aspects, methods and systems are disclosed for performing bidirectional decimation-in-frequency (DIF) FFT operations. The systems and methods may compute a DIF FFT operation based on a natural order input (with a radix-reversed order output) or on a radix-reversed order input (with a natural order output).

In one aspect, there is provided bidirectional circuitry for performing Fast Fourier Transform (FFT) operations. The circuitry includes a plurality of cascaded stages for computing a selectable one of, a forward decimation-in-frequency (DFT) FFT operation in a forward direction from an $i^{th}$ stage to a $j^{th}$ stage of the plurality of cascaded stages, and a reverse DFT FFT operation in a reverse direction from the $j^{th}$ stage to the $i^{th}$ stage of the plurality of cascaded stages. The circuitry has a first input for receiving first data for processing in the plurality of cascaded stages in the forward direction according to the forward DFT FFT operation, the first input being selectively coupled to an input of the $i^{th}$ stage of the plurality of cascaded stages. The circuitry has a second input for receiving second data for processing in the plurality of cascaded stages in the reverse direction according to the reverse DFT FFT operation, the second input being selectively coupled to an input of the $j^{th}$ stage of the plurality of cascaded stages.

In another aspect, there is provided a method of performing Fast Fourier Transform (FFT) operations in bidirectional circuitry. The method includes computing, using a plurality of cascaded stages in the bidirectional circuitry, a selectable one of, a forward decimation-in-frequency (DFT) FFT operation in a forward direction from an $i^{th}$ stage to a $i^{th}$ stage of the plurality of cascaded stages, and a reverse DFT FFT operation in a reverse direction from the $j^{th}$ stage to the $i^{th}$ stage of the plurality of cascaded stages. The method includes receiving, via a first input of said bidirectional circuitry, first data for processing in the plurality of cascaded stages in the forward direction according to the forward DFT FFT operation, the first input being selectively coupled to an input of the $i^{th}$ stage of the plurality of cascaded stages. The method includes receiving, via a second input of said bidirectional circuitry, second data for processing in the plurality of cascaded stages in the reverse direction according to the reverse DFT FFT operation, the second input being selectively coupled to an input of the $j^{th}$ stage of the plurality of cascaded stages.

A method of configuring such circuitry on a programmable device, a programmable device so configurable, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 2 shows a known forward radix-4 FFT architecture;

FIG. 3 is a simplified block diagram of an illustrative embodiment of a bidirectional DIF architecture for selectively processing forward FFT and/or reverse FFT operations, according to some embodiments the present disclosure;

FIG. 6 is a flowchart of a process of performing Fast Fourier Transform (FFT) operations in bidirectional circuitry according to the present invention;

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Unlike the unidirectional architecture of FIG. 2, embodiments of the present disclosure may allow bidirectional processing of FFT operations and may perform both reverse and forward FFT operations using the same structure. This may substantially improve performance, lower usage, and decrease size. Details of how to operationalize FFT bidirectionality are further described below.

Figure 1A:
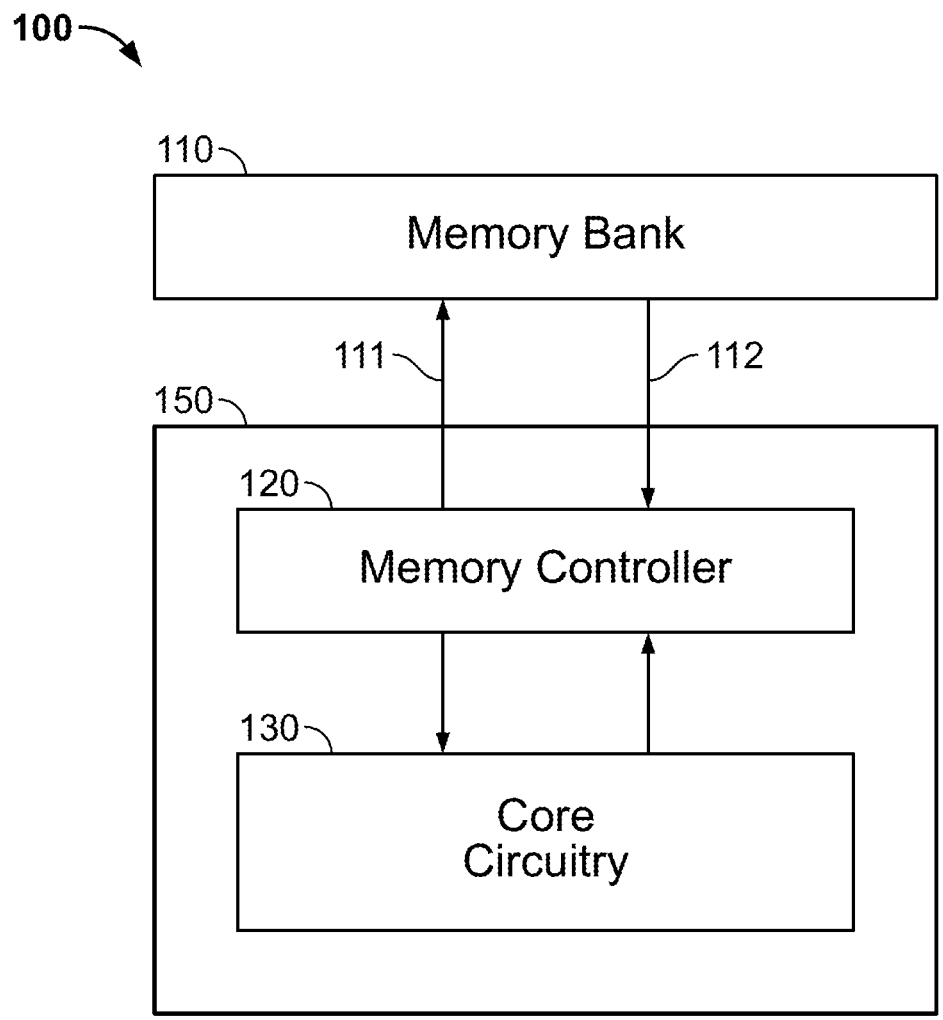
FIG. 1A is a simplified block diagram of an illustrative embodiment of an FFT computation architecture where systems and methods according to some embodiments the present disclosure may be applied.

FIG. 1A is a simplified block diagram of an illustrative embodiment of an FFT computation architecture where systems and methods according to the present disclosure may be applied. FIG. 1A illustrates an exemplary system 100 for FFT operations where the input data sequence for which an FFT is to be calculated may be stored in a memory bank 110 in accordance with some embodiments. In some embodiments, at least some components of system 100 may be located on an integrated circuit 150. Integrated circuit 150 can be an application-specific integrated circuit (ASIC), a programmable logic device (PLD), a field programmable gate array (FPGA), or a chip. It should also be understood that integrated circuit 150 may be a combination of devices, such as a FPGA and an ASIC, and/or may include additional, stand-alone circuit components. In some embodiments, the memory bank 110 may be external to integrated circuit 150. Integrated circuit 150 includes memory controller 120 and core circuitry 130. Core circuitry 130 can be general purpose programmable circuitry of any of several known types and constructions. Although, for clarity, the embodiments disclosed herein are primarily discussed within the context of FFT computation architectures provided on an integrated circuit, such FFT computation architectures can be provided in and/or on any suitable programmable or non-programmable device such as, for example, a PLD, an FPGA, an application-specific standard product (ASSP), an ASIC, a full-custom chip, or a dedicated chip. In an embodiment, core circuitry 130 may be PLD core circuitry or any other general processing circuitry.

Memory controller 120 may be coupled to memory bank 110. Examples of memory bank 110 that may be supported include SDRAM, or higher cost RLDRAM or QDRSRAM. Many variants of external memories (e.g., memory bank 110) can also be supported by the FFT architectures, systems, and methods disclosed herein.

Memory bank 110 may be divided into a number of memory banks, each of which may further contain a plurality of cells that may be arranged in an array of rows and column groups. Each column group in a given row may include a plurality of individual memory bit circuits, each of which may store one or more bits. Therefore, each cell can store a plurality of bits. Additionally, the bit width of each column group, which is defined as the number of bits contained in the individual memory bit circuits contained in a column group, may be substantially equal to an integer multiple of the memory's minimum burst size. The minimum burst size is the smallest addressable unit of memory that can be read or written in one transaction. For example, a typical value for DDR3 SDRAM memory may be 8 beats of 64-bit words (i.e., 8 groups of 64 bits).

In some embodiments, input data, whose FFT is to be calculated in core circuitry 130, is stored in memory bank 110 in an order that is different from the order it is processed in the FFT calculation. A natural order of data is the order in which the time-domain input data sequence, whose FFT is to be calculated, is stored in memory. For applications that involve a decimation-in-time (DIT) FFT computation, the input data sequence stored in memory bank 110 may correspond to time-domain samples x[n], n=0, ..., N−1, for which a forward FFT computation is to be calculated, and which has N data samples stored in the memory bank 110 in a natural order, i.e., according to the sequence 0, 1, ..., N−1. For applications that involve a decimation-in-frequency (DIF) FFT computation, the input data sequence stored in memory bank 110 may correspond to frequency-domain samples X[k], k=0, ..., N−1, for which an inverse FFT is to be computed, and which has N data samples stored in memory bank 110 in natural order, i.e., in the sequence 0,1, ..., N−1, or in any other order, i.e., in a sequence $i_1, i_2, ..., i_{N-1}$, where the sequence $i_1, i_2, ..., i_{N-1}$ defines some other order, such as a radix-reversed order. An FFT application generally involves at least one data sample x[n] or X[k] for operation at any point. Each data sample x[n] or X[k] may be associated with a corresponding numerical index used for memory addressing.

Core circuitry 130 may be configurable to calculate an FFT and output the final or intermediate data corresponding to the result of the FFT calculation to memory controller 120. In some embodiments, core circuitry 130 may be programmable to calculate an FFT using a radix R. In some embodiments, core circuitry 130 may be programmable to calculate an FFT where radix R is not identical for each pass of the FFT calculation. Memory controller 120 may further write and/or store the final or intermediate FFT calculation data to memory bank 110 or may unload the FFT calculation data to other internal or external memory structures or buffers. For simplicity, these other internal or external memory structures or buffers are not shown in FIG. 1A.

In some implementations, core circuitry 130 may be programmable to compute an N-point radix-4 FFT in multiple passes. Each pass may be associated with a number of properties. First, each pass may be associated with a respective data stride, defining a relation between indices of input data being processed to compute corresponding FFT bins. Second, each pass may be associated with a twiddle stride, indicating a relation between indices of twiddle factors being applied to the corresponding FFT bins. Third, each pass may be associated with a number of data groups being processed. For example, in the first stage of the N-point radix-4 FFT computation, the data stride is N/4, the twiddle stride is 1, and the number of data groups is 1. In the second stage, the data stride is N/16, the twiddle stride is 4, and the number of groups is 4. In each subsequent stage, the data stride is divided by 4, the number of groups is multiplied by 4, and the twiddle stride is multiplied by 4. In the last stage, twiddle factors are not applied—this operation can be considered a multiplication by 1.0+0j, i.e., by real unity. Each circulation of data through an FFT stage is referred to as a pass. A plurality of computation elements may be assembled and/or configured to define a single stage for carrying out a particular pass.

As an illustration, the case of N=256, four FFT stages, and radix R=4 will be discussed. This choice is purely for the purposes of illustration and other values of N and/or R may be used without departing from the scope of the present disclosure. In addition, any number of stages may be included, and only a subset of the stages may be configured as described herein. Accordingly, even though the rest of this disclosure will discuss four stages and refer to a first stage, second stage, third stage, and a fourth or last stage, these labels are not meant to be limiting, and the first, second, third, and fourth stages may correspond to any $i^{th}$, $k^{th}$, $l^{th}$, and $j^{th}$ stage of a plurality of stages (where i, k, l, and j are integers, labels, or any other suitable identifier).

For computing a 256-point FFT using radix 4, an FFT processor, such as core circuitry 130 of FIG. 1A, may process an input data sequence in an order where the input data samples are arranged in a particular way, such as in a radix-reversed order, as shown in Table 1. In the first pass of the FFT calculation, data samples corresponding to the first four row-wise elements 0, 64, 128, and 192 in Table 1 are used to compute a first radix-4 FFT bin; data samples corresponding to the second row-wise elements 16, 80, 144, and 208 are used to compute the next radix-4 FFT bin; and so on. The same process may also apply to data arranged in other ways, and can be implemented as an FFT or an IFFT operation. For example, although the implementation described herein manipulates data input in a radix-reversed order, this implementation is not intended to limit the process to IFFT operations, but to illustrate various applications and uses—e.g., to illustrate ways in which input data is processed and twiddle factors are stored and accessed in a bidirectional core.

TABLE 1

| Radix-Reversed Order | | | | | | | | | | | | | | | |
| --- | --- | --- | --- | --- | --- | --- | --- | --- | --- | --- | --- | --- | --- | --- | --- |
| 0 | 64 | 128 | 192 | 16 | 80 | 144 | 208 | 32 | 96 | 160 | 224 | 48 | 112 | 176 | 240 |
| 4 | 68 | 132 | 196 | 20 | 84 | 148 | 212 | 36 | 100 | 164 | 228 | 52 | 116 | 180 | 244 |
| 8 | 72 | 136 | 200 | 24 | 88 | 152 | 216 | 40 | 104 | 168 | 232 | 56 | 120 | 184 | 248 |

TABLE 1-continued

Radix-Reversed Order

| 12 | 76 | 140 | 204 | 28 | 92 | 156 | 220 | 44 | 108 | 172 | 236 | 60 | 124 | 188 | 252 |
|----|----|-----|-----|----|----|-----|-----|----|-----|-----|-----|----|-----|-----|-----|
| 1  | 65 | 129 | 193 | 17 | 81 | 145 | 209 | 33 | 97  | 161 | 225 | 49 | 113 | 177 | 241 |
| 5  | 69 | 133 | 197 | 21 | 85 | 149 | 213 | 37 | 101 | 165 | 229 | 53 | 117 | 181 | 245 |
| 9  | 73 | 137 | 201 | 25 | 89 | 153 | 217 | 41 | 105 | 169 | 233 | 57 | 121 | 185 | 249 |
| 13 | 77 | 141 | 205 | 29 | 93 | 157 | 221 | 45 | 109 | 173 | 237 | 61 | 125 | 189 | 253 |
| 2  | 66 | 130 | 194 | 18 | 82 | 146 | 210 | 34 | 98  | 162 | 226 | 50 | 114 | 178 | 242 |
| 6  | 70 | 134 | 198 | 22 | 86 | 150 | 214 | 38 | 102 | 166 | 230 | 54 | 118 | 182 | 246 |
| 10 | 74 | 138 | 202 | 26 | 90 | 154 | 218 | 42 | 106 | 170 | 234 | 58 | 122 | 186 | 250 |
| 14 | 78 | 142 | 206 | 30 | 94 | 158 | 222 | 46 | 110 | 174 | 238 | 62 | 126 | 190 | 254 |
| 3  | 67 | 131 | 195 | 19 | 83 | 147 | 211 | 35 | 99  | 163 | 227 | 51 | 115 | 179 | 243 |
| 7  | 71 | 135 | 199 | 23 | 87 | 151 | 215 | 39 | 103 | 167 | 231 | 55 | 119 | 183 | 247 |
| 11 | 75 | 139 | 203 | 27 | 91 | 155 | 219 | 43 | 107 | 171 | 235 | 59 | 123 | 187 | 251 |
| 15 | 79 | 143 | 207 | 31 | 95 | 159 | 223 | 47 | 111 | 175 | 239 | 63 | 127 | 191 | 255 |

To determine the appropriate data stride for a given FFT pass, a data addressing map such as the one shown in Table 2 may be used. Table 2 shows an illustrative data addressing map for the first pass. Each FFT bin is represented by a four-element column in Table 2. The data stride appropriate for performing a radix-4 FFT computation for the first pass may be determined from Table 1 and Table 2 as follows. The first bin in the first pass of the FFT computation is determined from the first four-element column [0, 1, 2, 3] of Table 2. The elements in the first four-element column 0, 1, 2, and 3 of Table 2 are, respectively, indices in Table 1 of the frequency bin indices 0, 64, 128, and 192, as read from the first row of the radix-reversed order in Table 1. Similarly, the second bin in the first pass is determined from the second four-element column [64, 65, 66, 67] of Table 2. The elements in this second four-element column 64, 65, 66, and 67 of Table 2 are, respectively, indices in Table 1 of the frequency bin indices 1, 65, 129, and 194, as read from the sixth row of radix-reversed order in Table 1.

TABLE 2

Data Addressing in Pass 1

| 0   | 4   | 8   | 12  | 16  | 20  | 24  | 28  | 32  | 36  | 40  | 44  | 48  | 52  | 56  | 60  |
|-----|-----|-----|-----|-----|-----|-----|-----|-----|-----|-----|-----|-----|-----|-----|-----|
| 1   | 5   | 9   | 13  | 17  | 21  | 25  | 29  | 33  | 37  | 41  | 45  | 49  | 53  | 57  | 61  |
| 2   | 6   | 10  | 14  | 18  | 22  | 26  | 30  | 34  | 38  | 42  | 46  | 50  | 54  | 58  | 62  |
| 3   | 7   | 11  | 15  | 19  | 23  | 27  | 31  | 35  | 39  | 43  | 47  | 51  | 55  | 59  | 63  |
| 64  | 68  | 72  | 76  | 80  | 84  | 88  | 92  | 96  | 100 | 104 | 108 | 112 | 116 | 120 | 124 |
| 65  | 69  | 73  | 77  | 81  | 85  | 89  | 93  | 97  | 101 | 105 | 109 | 113 | 117 | 121 | 125 |
| 66  | 70  | 74  | 78  | 82  | 86  | 90  | 94  | 98  | 102 | 106 | 110 | 114 | 118 | 122 | 126 |
| 67  | 71  | 75  | 79  | 83  | 87  | 91  | 95  | 99  | 103 | 107 | 111 | 115 | 119 | 123 | 127 |
| 128 | 132 | 136 | 140 | 144 | 148 | 152 | 156 | 160 | 164 | 168 | 172 | 176 | 180 | 184 | 188 |
| 129 | 133 | 137 | 141 | 145 | 149 | 153 | 157 | 161 | 165 | 169 | 173 | 177 | 181 | 185 | 189 |
| 130 | 134 | 138 | 142 | 146 | 150 | 154 | 158 | 162 | 166 | 170 | 174 | 178 | 182 | 186 | 190 |
| 131 | 135 | 139 | 143 | 147 | 151 | 155 | 159 | 163 | 167 | 171 | 175 | 179 | 183 | 187 | 191 |
| 192 | 196 | 200 | 204 | 208 | 212 | 216 | 220 | 224 | 228 | 232 | 236 | 240 | 244 | 248 | 252 |
| 193 | 197 | 201 | 205 | 209 | 213 | 217 | 221 | 225 | 229 | 233 | 237 | 241 | 245 | 249 | 253 |
| 194 | 198 | 202 | 206 | 210 | 214 | 218 | 222 | 226 | 230 | 234 | 238 | 242 | 246 | 250 | 254 |
| 195 | 199 | 203 | 207 | 211 | 215 | 219 | 223 | 227 | 231 | 235 | 239 | 243 | 247 | 251 | 255 |

To determine the appropriate twiddle stride for a given FFT pass, a twiddle addressing map such as the one shown in Table 3 may be used. Table 3 shows the twiddle addressing map for the first pass. Each four-element column of Table 3 corresponds to one radix-4 FFT bin. In some implementations, these indices are locations in a twiddle memory, where the value '1' is stored at location index 0, and specific twiddle factor values are stored at different location indices. The first bin of the radix is multiplied by 1, which corresponds to the values stored at indices 0, 0, 0, 0 in the first four column-wise elements of Table 3. The second bin of the radix is multiplied by indexed twiddle factor values, stored at indices 0, 1, 2, 3 in the second four column-wise elements of Table 3. The addressing spacing in this sequence 0, 1, 2, 3 (i.e., address spacing of 1) can be found from the radix-reversed order with a spacing of 4. The last two four-element columns in Table 3 are a multiple of the spacing index as defined in the second four-element column. In particular, the third bin has values that are twice the spacing index, and the fourth bin has values that are three times the spacing index.

TABLE 3

Twiddle Addressing for Pass 1

| 0 | 0  | 0  | 0   | 0  | 0  | 0   | 0   | 0  | 0  | 0   | 0   | 0  | 0  | 0   | 0   |
|---|----|----|-----|----|----|-----|-----|----|----|-----|-----|----|----|-----|-----|
| 0 | 16 | 32 | 48  | 4  | 20 | 36  | 52  | 8  | 24 | 40  | 56  | 12 | 28 | 44  | 60  |
| 0 | 32 | 64 | 96  | 8  | 40 | 72  | 104 | 16 | 48 | 80  | 112 | 24 | 56 | 88  | 120 |
| 0 | 48 | 96 | 144 | 12 | 60 | 108 | 156 | 24 | 72 | 120 | 168 | 36 | 84 | 132 | 180 |
| 0 | 0  | 0  | 0   | 0  | 0  | 0   | 0   | 0  | 0  | 0   | 0   | 0  | 0  | 0   | 0   |
| 1 | 17 | 33 | 49  | 5  | 21 | 37  | 53  | 9  | 25 | 41  | 57  | 13 | 29 | 45  | 61  |
| 2 | 34 | 66 | 98  | 10 | 42 | 74  | 106 | 18 | 50 | 82  | 114 | 26 | 58 | 90  | 122 |

TABLE 3-continued

Twiddle Addressing for Pass 1

| 3 | 51 | 99 | 147 | 15 | 63 | 111 | 159 | 27 | 75 | 123 | 171 | 39 | 87 | 135 | 183 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 2 | 18 | 34 | 50 | 6 | 22 | 38 | 54 | 10 | 26 | 42 | 58 | 14 | 30 | 46 | 62 |
| 4 | 36 | 68 | 100 | 12 | 44 | 76 | 108 | 20 | 52 | 84 | 116 | 28 | 60 | 92 | 124 |
| 6 | 54 | 102 | 150 | 18 | 66 | 114 | 162 | 30 | 78 | 126 | 174 | 42 | 90 | 138 | 186 |
| 0 | 0 | 0 | 0 | 0 | 0 | 0 | 0 | 0 | 0 | 0 | 0 | 0 | 0 | 0 | 0 |
| 3 | 19 | 35 | 51 | 7 | 23 | 39 | 55 | 11 | 27 | 43 | 59 | 15 | 31 | 47 | 63 |
| 6 | 38 | 70 | 102 | 14 | 46 | 78 | 110 | 22 | 54 | 86 | 118 | 30 | 62 | 94 | 126 |
| 9 | 57 | 105 | 153 | 21 | 69 | 117 | 165 | 33 | 81 | 129 | 177 | 45 | 93 | 141 | 189 |

Similar mechanisms may be used to determine stage properties for subsequent passes. For example, for the second pass, each of the group size and the twiddle indexing is quadrupled. Table 4 shows a data addressing map for the second pass.

TABLE 4

Data Addressing in Pass 2

| 0 | 1 | 2 | 3 | 16 | 17 | 18 | 19 | 32 | 33 | 34 | 35 | 48 | 49 | 50 | 51 |
|---|---|---|---|---|---|---|---|---|---|---|---|---|---|---|---|
| 4 | 5 | 6 | 7 | 20 | 21 | 22 | 23 | 36 | 37 | 38 | 39 | 52 | 53 | 54 | 55 |
| 8 | 9 | 10 | 11 | 24 | 25 | 26 | 27 | 40 | 41 | 42 | 43 | 56 | 57 | 58 | 59 |
| 12 | 13 | 14 | 15 | 28 | 29 | 30 | 31 | 44 | 45 | 46 | 47 | 60 | 61 | 62 | 63 |
| 64 | 65 | 66 | 67 | 80 | 81 | 82 | 83 | 96 | 97 | 98 | 99 | 112 | 113 | 114 | 115 |
| 68 | 69 | 70 | 71 | 84 | 85 | 86 | 87 | 100 | 101 | 102 | 103 | 116 | 117 | 118 | 119 |
| 72 | 73 | 74 | 75 | 88 | 89 | 90 | 91 | 104 | 105 | 106 | 107 | 120 | 121 | 122 | 123 |
| 76 | 77 | 78 | 79 | 92 | 93 | 94 | 95 | 108 | 109 | 110 | 111 | 124 | 125 | 126 | 127 |
| 128 | 129 | 130 | 131 | 144 | 145 | 146 | 147 | 160 | 161 | 162 | 163 | 176 | 177 | 178 | 179 |
| 132 | 133 | 134 | 135 | 148 | 149 | 150 | 151 | 164 | 165 | 166 | 167 | 180 | 181 | 182 | 183 |
| 136 | 137 | 138 | 139 | 152 | 153 | 154 | 155 | 168 | 169 | 170 | 171 | 184 | 185 | 186 | 187 |
| 140 | 141 | 142 | 143 | 156 | 157 | 158 | 159 | 172 | 173 | 174 | 175 | 188 | 189 | 190 | 191 |
| 192 | 193 | 194 | 195 | 208 | 209 | 210 | 211 | 224 | 225 | 226 | 227 | 240 | 241 | 242 | 243 |
| 196 | 197 | 198 | 199 | 212 | 213 | 214 | 215 | 228 | 229 | 230 | 231 | 244 | 245 | 246 | 247 |
| 200 | 201 | 202 | 203 | 216 | 217 | 218 | 219 | 232 | 233 | 234 | 235 | 248 | 249 | 250 | 251 |
| 204 | 205 | 206 | 207 | 220 | 221 | 222 | 223 | 236 | 237 | 238 | 239 | 252 | 253 | 254 | 255 |

Table 5 shows the twiddle addressing map for the second pass. The twiddle addressing map in Table 4 may be obtained from Table 1 by changing the data stride in Table 1 from 4 to 16, and multiplying the index value by four.

TABLE 5

Twiddle Addressing in Pass 2

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 16 | 16 | 16 | 16 | 32 | 32 | 32 | 32 | 48 | 48 | 48 | 48 |
| 0 | 0 | 0 | 0 | 32 | 32 | 32 | 32 | 64 | 64 | 64 | 64 | 96 | 96 | 96 | 96 |
| 0 | 0 | 0 | 0 | 48 | 48 | 48 | 48 | 96 | 96 | 96 | 96 | 144 | 144 | 144 | 144 |
| 0 | 0 | 0 | 0 | 0 | 0 | 0 | 0 | 0 | 0 | 0 | 0 | 0 | 0 | 0 | 0 |
| 4 | 4 | 4 | 4 | 20 | 20 | 20 | 20 | 36 | 36 | 36 | 36 | 52 | 52 | 52 | 52 |
| 8 | 8 | 8 | 8 | 40 | 40 | 40 | 40 | 72 | 72 | 72 | 72 | 104 | 104 | 104 | 104 |
| 12 | 12 | 12 | 12 | 60 | 60 | 60 | 60 | 108 | 108 | 108 | 108 | 156 | 156 | 156 | 156 |
| 0 | 0 | 0 | 0 | 0 | 0 | 0 | 0 | 0 | 0 | 0 | 0 | 0 | 0 | 0 | 0 |
| 8 | 8 | 8 | 8 | 24 | 24 | 24 | 24 | 40 | 40 | 40 | 40 | 56 | 56 | 56 | 56 |
| 16 | 16 | 16 | 16 | 48 | 48 | 48 | 48 | 80 | 80 | 80 | 80 | 112 | 112 | 112 | 112 |
| 24 | 24 | 24 | 24 | 72 | 72 | 72 | 72 | 120 | 120 | 120 | 120 | 168 | 168 | 168 | 168 |
| 0 | 0 | 0 | 0 | 0 | 0 | 0 | 0 | 0 | 0 | 0 | 0 | 0 | 0 | 0 | 0 |
| 12 | 12 | 12 | 12 | 28 | 28 | 28 | 28 | 44 | 44 | 44 | 44 | 60 | 60 | 60 | 60 |
| 24 | 24 | 24 | 24 | 56 | 56 | 56 | 56 | 88 | 88 | 88 | 88 | 120 | 120 | 120 | 120 |
| 36 | 36 | 36 | 36 | 84 | 84 | 84 | 84 | 132 | 132 | 132 | 132 | 180 | 180 | 180 | 180 |

Tables 4 and 5 may be used to determine the data addressing and twiddle addressing, respectively, in the second pass. For example, the following data addressing and twiddle addressing are determined from Tables 4 and 5 for group 1 of 4.
Data addressing: 0,16,32,48,1,17,33,49, 2,18,34,50, . . . , 15,31,47,63
Twiddle addressing: 0,0,0,0, 0,4,8,12,0,8,16,24,0,12,24, 36, . . . , 0,60,120,180
Similarly, the following data addressing and twiddle addressing may be determined from tables 4 an 5 for group 2 of 4.
Data addressing: 64,80,96,112,65,81,97,113,66,82,98, 114, . . . , 79,95,111,127.
Twiddle addressing: 0,0,0,0,0,4,8,12,0,8,16,24,0,12,24, 36, . . . , 0,60,120,180

The twiddle addressing is the same for group 1 and 2, as well as the remaining groups 3 and 4 in the second pass.

In the last (fourth) stage, twiddle factors are not applied and the FFT bins are multiplied by unity. The fourth (last) pass of the radix-4 FFT algorithm is associated with the following data addressing: 0,1,2,3,4,5,6,7,8,9, . . . , 251,252,253,254. The data is thus output in natural order.

As explained above, FFT data is generally output from radix FFT implementations in radix-reversed order. In the case of a pure radix-4 FFT implementation, the FFT data will also be in an order called digit-reversed order. The digit-reversed order can be calculated by reversing the digit ordering of the data addressing. For the 256-point radix-4 FFT, the natural order is {8,7,6,5,4,3,2,1}, and the digit-reversed order is {2,1,4,3,6,5,8,7}.

Figure 1B:
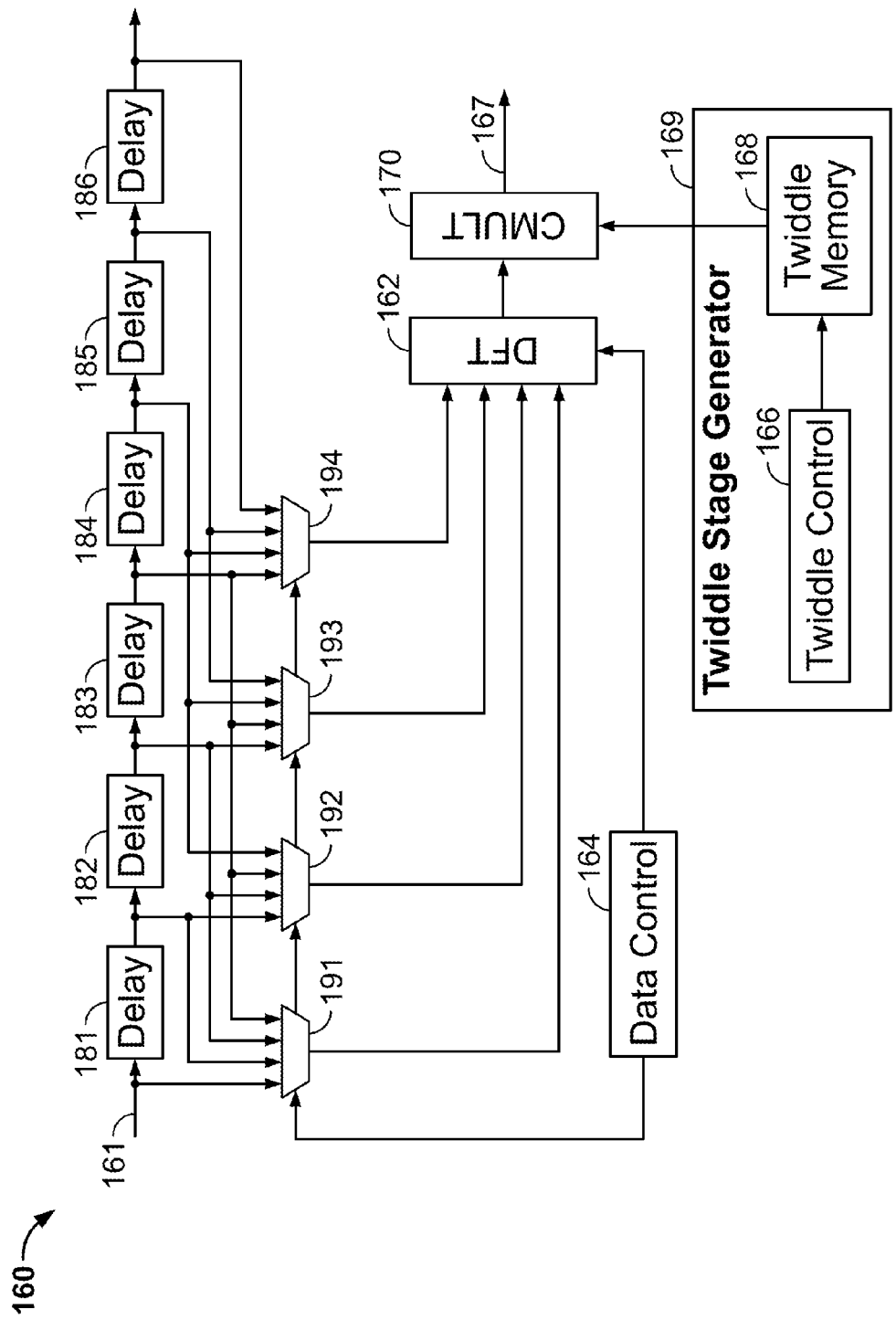
FIG. 1B shows an exemplary stage of a radix-4 FFT architecture, according to some embodiments the present disclosure.

FIG. 1B shows an exemplary stage 160 of a radix-4 FFT architecture, such as one implemented as part of core circuitry 130 of FIG. 1A. Stage 160 includes delay blocks 181 through 186, selection circuitries 191 through 194, Discrete Fourier Transform (DFT) block 162, data control block 164, multiplier circuitry 170, and twiddle stage generator 169. Twiddle stage generator 169 may include twiddle control block 166 and twiddle memory 168. Twiddle memory 168 may be a standalone memory component, or may be part of another memory component, such as memory bank 110 of FIG. 1A.

Input data is fed to stage 160 at 161. This input stage data may correspond to input data samples or to data output from a previous stage. Data control 164 determines the identity and order of the data samples to be processed by DFT block 162, by controlling the number of delay blocks being applied to the input data fed at 161. This is done by controlling the selection circuitry 191, 192, 193, and/or 194. The number of delay blocks being applied depends on the data stride associated with the particular FFT pass being implemented by stage 160. In the exemplary case where N=256, stage 160 would include delays of N/4=64 for the first pass, N/16=16 for the second pass, and 16/4=4 for the third pass. These delays correspond to the data strides associated with each pass, as described above.

The input stage data output by selection circuitries 191, 192, 193, and/or 194 is processed by DFT block 162. DFT block 162 may be implemented similarly to core circuitry 130 of FIG. 1A. An output of the DFT block 162 is multiplied by twiddle factors $W_i$ using multiplier circuitry 170 to generate FFT output data 167. The multiplier circuitry 170 may or may not support complex multiplications, depending, e.g., on whether the twiddle factors of the stage being implemented are real or complex. The twiddle factors $W_i$ are generated from twiddle stage generator 169. A twiddle stage generator generates particular ones of the twiddle factors, as specified by a twiddle stride for that particular stage. For example, the twiddle stride is 1 for the first stage, 4 for the second stage, and so on as defined by the N-point radix-4 FFT algorithm above. In some implementations, a twiddle stage generator 169 generates a set of twiddle factors from twiddle memory 168 as controlled by twiddle control block 166. In some implementations, twiddle control block 166 generates twiddle addressing indices for reading particular ones of the twiddle factors corresponding to the appropriate twiddle stride for that particular stage. For example, twiddle control block 166 may implement structures such as the twiddle addressing maps in Table 3 or Table 5 above.

Machine-implemented computations of an FFT may cascade together a series of stages such as stage 160 of FIG. 1B. An exemplary architecture 200 that cascades together a series of stages and its associated limitations were described in context of FIG. 2 above.

Unlike the unidirectional architecture of FIG. 2, some embodiments of the present disclosure allow bidirectional processing of FFT operations and may perform both reverse and forward FFT operations using the same structure. This may substantially improve performance, lower usage, and decrease size.

Embodiments of the present disclosure recognize that, starting from an input data sequence in a radix-reversed order, an FFT operation will process the radix-reversed input data in the right order if the pass order is reversed. For example, starting from a radix-reversed input data sequence, an FFT operation will apply a data stride that addresses the correct locations in the radix-reversed data if the pass order is reversed. An exemplary 256-point radix-4 FFT computation can be used to illustrate this. For the first pass, embodiments of the present disclosure recognize that radix-reversed data indices {0,64,128,192,16,80,144,208, ... } correspond to the correct data locations, provided that the radix-reversed order is indexed in the order of the last pass, i.e., with indices {0,1,2,3,4,5,6,7, ... }. This is because the data stride for the first pass is 64. Similarly, for the second pass, the radix-reversed indices {0,16,32,48,64,80,96,112, ... } correspond to the correct data locations because the second pass data stride of 16, provided that the radix-reversed order is indexed in the order of the first to last pass, i.e., with indices {0,4,8, 12,1,5,9,13, ... }.

While inverting the pass order takes care of the data addressing to process radix-reversed input data in the correct order, such pass order inversion may not be sufficient to apply the appropriate twiddle addressing. For example, a first-pass FFT computation may be handled by a last-pass FFT stage, but the involved twiddle factors still correspond to the first pass. Similarly, a second-pass FFT operation may be handled by a first-to-last-pass FFT stage, but the involved twiddle factors still correspond to the second pass. To remedy this, embodiments of the present disclosure address the twiddle factors using digit-reversed indexing to process the radix-reversed input data. For example, in order apply the correct twiddle factors, the twiddle factor indices for the values that are applied to the second bin of the radix-4 FFT are {0, 16, 32, 48, 4, 20, 36, 52, 8, 24}.

FIG. 3 is a simplified block diagram of an illustrative embodiment of bidirectional DIF architecture 300 for selectively processing forward FFT and/or reverse FFT operations. Bidirectional DIF architecture 300 includes cascaded stages 301, 302, 303, and 304. Bidirectional DIF architecture 300 also includes input 351 for receiving data for processing in the cascaded stages according to a forward DFT FFT operation. Bidirectional DIF architecture 300 also includes input 352 for receiving data for processing in the cascaded stages according to a reverse DFT FFT operation. The cascaded stages 301, 302, 202, and 304 are serially coupled via selection circuitries 312, 313, 314, and 311, respectively. Bidirectional DIF architecture 300 may also include twiddle stage generators 332, 334, and 336, and selection circuitries 322 and 324.

In some implementations, the cascaded stages 301, 302, 303, and 304 are configured for computing a selectable one of a DFT FFT operation in a forward direction from first stage 301 to fourth stage 304, and a reverse DFT FFT operation in a reverse direction from the fourth stage 304 to first stage 301. Data may be input at input 351 in natural order for processing according to the forward DFT FFT operation in the forward direction. The input 351 is selectively coupled to the input of the first stage 301. Data may be input at input 352 in radix-reversed order for processing according to the reverse DFT FFT operation in the reverse direction. The input 352 is selectively coupled to the input of the fourth stage 304.

Data flows through stages 301, 302, 303, and 304 for the forward DFT FFT operations, and/or through stages 304, 303, 302, and 301 for the reverse DFT FFT operations. This is accomplished by interleaving the cascaded stages with selection circuitry 311, 312, 313, and 314.

The first stage 301 has an input coupled to an output of selection circuitry 311, which selects from a first input coupled to the input 351 for receiving data for processing according to the forward DFT FFT, and a second input coupled to an output of the fourth stage 304.

The second stage 302 has an input coupled to an output of selection circuitry 312, which selects from a first input coupled to an output of the first stage 301, and a second input coupled to an output of the third stage 303.

The third stage 303 has an input coupled to an output of selection circuitry 313, which selects from a first input coupled to an output of the second stage 302, and a second input coupled to the output of the fourth stage 304.

The fourth stage 304 has an input coupled to an output of selection circuitry 314, which selects from a first input coupled to input 352 for receiving data for processing according to the reverse DFT FFT, and a second input coupled to the output of the third stage 303.

Each of twiddle stage generators 332, 334, and 336 is configured to generate a respective set of twiddle factors corresponding to a particular FFT stage in the forward direction and another particular stage in the reverse direction.

Twiddle stage generator 332 is coupled to both the first stage 301 and the fourth stage 304. This twiddle stage generator 332 may generate first pass twiddle factors to the first stage 301 in response to data being processed in the forward direction according to the forward DFT FFT operation. Twiddle stage generator 332 may generate first pass twiddle factors to the fourth stage 304 in response to data being processed in the reverse direction according to the reverse DFT FFT operation. In some implementations, the first pass twiddle factors generated for the forward DFT FFT operation and those generated for the reverse DFT FFT operation are the same, except that the latter may be in digit-reversed order. This may be accomplished by using selection circuitry, such as a 2:1 multiplexer inside of twiddle stage generator 332, to generate the first pass twiddle factors in digit-reversed order for the reverse direction.

Twiddle stage generator 334 is selectively coupled to the second stage 302 through selection circuitry 322 and the third stage 303 through selection circuitry 324. Twiddle stage generator 334 may generate second pass twiddle factors to the second stage 302 in response to data being processed in the forward direction according to the forward DFT FFT operation. Twiddle stage generator 334 may generate second pass twiddle factors to the third stage 304 in response to data being processed in the reverse direction according to the reverse DFT FFT operation. In some implementations, the second pass twiddle factors generated for the forward DFT FFT operation and those generated for the reverse DFT FFT operation are the same, except that the latter may be in digit-reversed order. This may be accomplished by using selection circuitry, such as a 2:1 multiplexer inside of twiddle stage generator 334, to generate the second pass twiddle factors in digit-reversed order.

Twiddle stage generator may be connected to second and third stages similarly to twiddle stage generator 334, i.e., twiddle stage generator 336 may be selectively coupled to the second stage 302 through selection circuitry 322 and the third stage 303 through selection circuitry 324. Twiddle stage generator 336 may generate third pass twiddle factors to the third stage 303 in response to data being processed in the forward direction according to the forward DFT FFT operation. Twiddle stage generator 336 may generate third pass twiddle factors to the second stage 304 in response to data being processed in the reverse direction according to the reverse DFT FFT operation. In some implementations, the second pass twiddle factors generated for the forward DFT FFT operation and those generated for the reverse DFT FFT operation are the same, except that the latter may be in digit-reversed order. This may be accomplished by using selection circuitry, such as a 2:1 multiplexer inside of twiddle stage generator 336, to generate the third pass twiddle factors in digit-reversed order.

In a reverse DFT FFT operation, the data flows from the fourth stage 304 to the first stage 301, i.e., the first pass of the reverse DFT FFT operation is implemented by the fourth stage 304, the second pass of the reverse DFT FFT operation is implemented by the third stage 303, the third pass of the reverse DFT FFT by the second stage 302, and the fourth pass of the reverse DFT FFT by the first stage 301. However, the twiddle factors are generated to correspond to the first stage 301, second stage 302, and third stage 303, i.e., the first pass of the reverse DFT FFT operation is multiplied by twiddle factors corresponding to the first stage 301, the second pass of the reverse DFT FFT operation is multiplied by twiddle factors corresponding to the second stage 302, and the third pass of the reverse DFT FFT operation is implemented by the third stage 303 (the fourth pass is multiplied by unity, as explained above). This is accomplished in some implementations by using the stages in reversed order, thereby allowing reuse of the same resources (e.g., delay structures), but providing twiddle factors from stages in forward order. The twiddle factors are provided from the stages in forward order, e.g., through use of selection circuitries such as circuitries 322 and 324, and in digit-reversed order, e.g., using selection circuitry such as a 2:1 multiplexers in the twiddle stage generators as described above. The last stage (fourth stage in this case) will now have a complex multiplier included such as the multiplier circuitry 170 of FIG. 1B because the last stage may now handle multiplication by complex twiddle factors.

The systems and methods discussed above can be adapted to perform other types of FFT operations, such as mixed radix 4/2 FFT operations.

Figure 4:
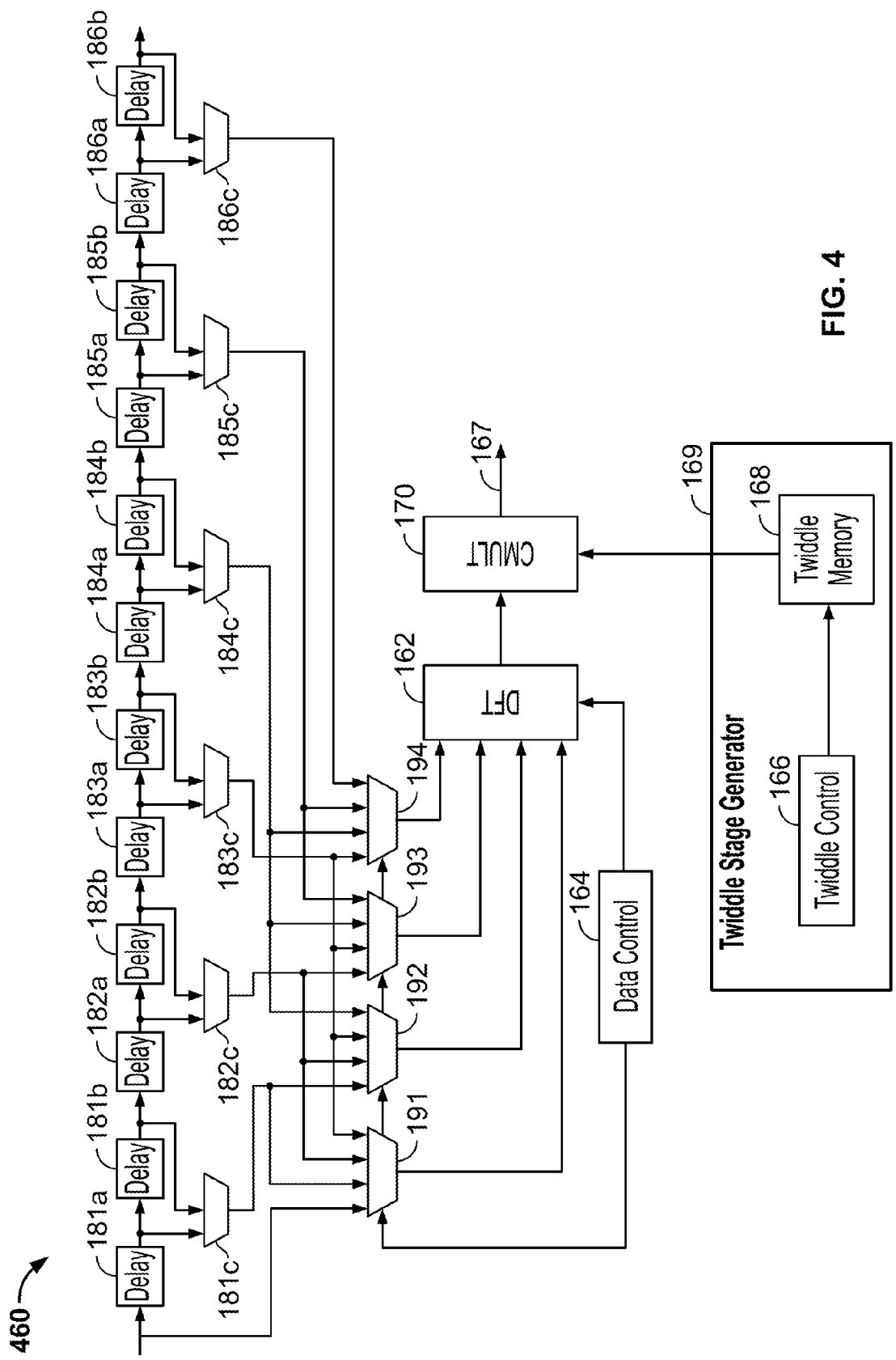
FIG. 4 shows an exemplary stage of a mixed radix 4/2 FFT architecture, according to some embodiments the present disclosure.

FIG. 4 shows an exemplary stage 460 of a mixed radix 4/2 FFT architecture, such as one implemented in system 100 of FIG. 1A. Exemplary mixed radix 4/2 stage 460 is similar to exemplary pure radix-4 stage 160, except that a tap is added in the middle of each delay to switch between radix 4 and radix 2. In particular, delay 181 of FIG. 1B is split into two delays 181a and 181b, which are coupled to selection circuitries 191 and 192 through tap 181c, as shown in FIG. 4. Similarly, delays 182 through 186 of FIG. 1B are split into respective delay block pairs (182a, 182b) through (186a, 186b). Each delay block pair is coupled to one or two of the selection circuitries 191 through 194 through a corresponding tap from taps 181c through 186c, as illustrated in FIG. 4. The first stage data stride would still be N/4 (as in the radix-4 case), the second stage data stride would still be N/16, and the third stage would still be N/64, but the final stage calculates a radix-2 DFT. Alternatively, mixed radix 4/2 FFT operations may be performed by computing an FFT of size N=128 using a pure radix-4 stage architecture such as architecture 160 of FIG. 1B, and then computing a radix-2 DFT operation.

Figure 5:
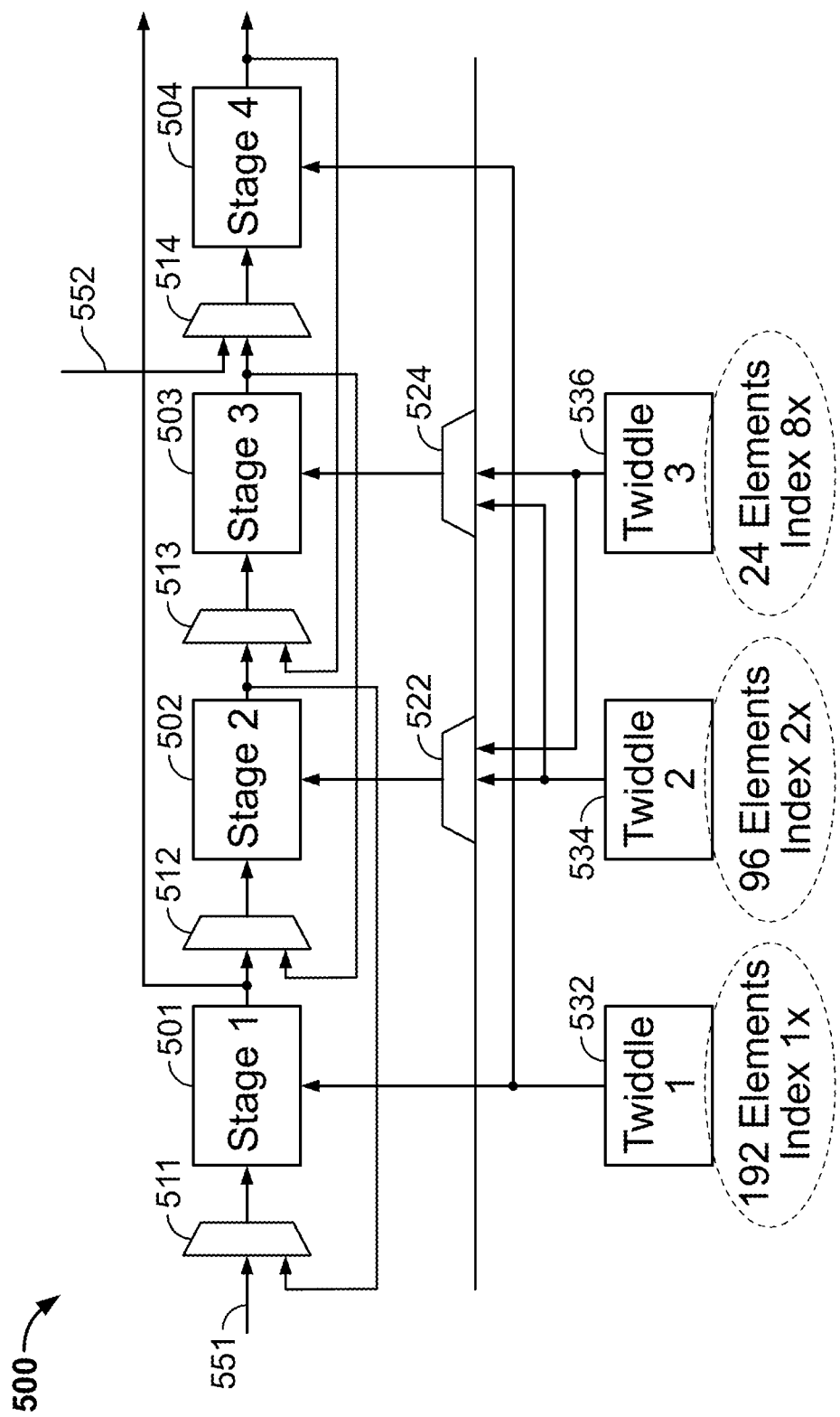
FIG. 5 is a simplified block diagram of an illustrative embodiment of a bidirectional DIF architecture for selectively processing forward mixed radix FFT and/or reverse mixed radix FFT operations.

FIG. 5 is a simplified block diagram of an illustrative embodiment of bidirectional DIF architecture 500 for selectively processing forward mixed radix FFT and/or reverse mixed radix FFT operations. The illustrated case is for mixed radix 4/2 FFT. Data striding is implemented similarly to bidirectional DIF architecture 300 for radix 4, i.e., using cascaded stages 501, 502, 503, and 504 interleaved with selection circuitries 511, 512, 513, and 514. Like in the pure radix-4 architecture 300 of FIG. 3, the cascaded stages 501, 502, 503, and 504 are traversed in the forward direction for forward FFT operations and in the reverse direction for reverse FFT operations, using selection circuitries 513 and 514.

One difference between the mixed radix architecture 500 of FIG. 5 and the pure radix architecture 300 of FIG. 3 pertains to twiddle factors, e.g., what twiddle factors are applied and how many are generated at a given pass. In some implementations, the twiddle stride in the mixed radix case may be a multiple of the twiddle stride in the pure radix case. Because the forward mixed radix 4/2 FFT may be calculated by a series of radix-4 stages, followed by a radix-2 stage and the reverse mixed radix 4/2 FFT may be calculated by a radix-2 stage followed by a series of radix-4 stages, the twiddle stride will correspond to radix 2 even for radix-4 stages. Accordingly, the twiddle stride in the forward FFT operation case is 1, 4, 16 (similar to the pure radix-4 case), and the twiddle stride in the reverse FFT operation case is 1, 2, 8 (i.e., half that of the pure radix-4 case or half of that of the forward FFT operation). In the illustrated architecture 500, the number of groups per pass for N=128 is 1, 4, 16, and 64 in the forward FFT direction, and 1, 2, 8, and 32 in the reverse FFT direction. Therefore, in addition to handling the twiddle data generation like in the radix-4 case (i.e., by using twiddle stage generators in reverse order as described in FIG. 3 above), the twiddle factor stride or spacing corresponds to radix-2 even though the DFT being computed is radix-4. A twiddle stage generator in this case, e.g., twiddle stage generator 532, 534, or 536, may be configured to provide a group of twiddle factors to a selectable one of an FFT stage in the forward direction or another IFFT stage in the reverse direction. The twiddle stride provided in the backward direction may be half of that provided in the forward direction. For example, twiddle stage generator 534 may provide second-pass twiddle factors with twiddle stride 4 to the third stage 503 in the forward direction or with twiddle stride 2 to the second stage 502 in the reverse direction. Selection circuitry 522 is used to select which of the third or second stage receives the generated twiddle factors. Similarly to twiddle stage generator 534, twiddle stage generator 536 may provide third-pass twiddle factors to the second stage 502 with twiddle stride 16 in the forward direction and to the third stage 503 with twiddle stride 8 in the reverse direction. Selection circuitry 524 is used to select which of the second or third stage receives the generated twiddle factors. Finally, twiddle stage generator 532 may provide first-pass twiddle factors group to the first stage 501 with stride 1 in the forward direction and to the fourth stage 504 with the same stride 1 in the reverse direction.

Because the twiddle stride of the mixed radix 4/2 case is half that of the pure radix-4 case for the reverse FFT operations, the twiddle addressing map is twice the size that of the pure radix-4 case. In some implementations, the reverse (and larger) tables are also used for the forward direction. In some implementations, the number of first-pass twiddle factors generated by twiddle stage generator 532 is still 192 (same as twiddle stage generator 332 in the forward case), but the number of second-pass twiddle factors generated by twiddle stage generator 534 is 96, and the number of third pass twiddle factors generated by twiddle stage generator 536 is 24.

Another difference between the mixed radix architecture 500 of FIG. 5 and the pure radix architecture 300 of FIG. 3 pertains to the radix values implemented by at least some of the FFT stages. In the exemplary 256-point pure radix-4 architecture 300 of FIG. 3, each of the four illustrated stages performs radix-4 operations. In one implementation of the mixed radix 4/2 architecture 500 of FIG. 5, each of the first, second, and third stages 501, 502, and 503, implements a 128-point radix-4 operation, and the fourth stage 504 implements a radix-2 operation.

In one implementation of architecture 500, one or more of the stages is implemented like stage 460 of FIG. 4. Where the stage of architecture 500 calculates a radix-4 DFT for a radix-2 length FFT (for example, stage 501, 502, or 503 in the forward direction), the taps 181c, 182c, . . . , and/or 186c of stage 460 are used, but not the selection circuitries 191 through 194. Where the stage of architecture 500 calculates a radix-2 DFT for the radix-2 length FFT, the taps 181c, 182c, . . . , and/or 186c of FIG. 4 are not used, but the selection circuitries 191 through 194 are. For example, where the fourth stage 504 computes a radix-2 (not radix-4) DFT, the same hardware can be used, as a radix-2 DFT can be viewed as a subset of the radix-4 DFT if both are calculated using a matrix-multiplication type of operation. In some implementations, radix-2 implementations will have some of the radix-4 DFT implementation turned off using appropriate selection circuitries.

For the IFFT using the same architecture 500, the data enters fourth stage 504, then goes to third stage 503, second stage 502, and first stage 501, in turn. In the reverse FFT direction, stage 501 is radix-2 and stages 502, 503, and 504 are radix-4 (i.e., the opposite pattern to the forward direction). As such, each of the first stage 501 and fourth stage 504 are implemented to selectively switch between radix-2 and radix-4 operations. For example, first stage 501 would be radix-4 in the forward direction and radix-2 in the reverse direction; fourth stage 504 would be radix-2 in the forward direction and radix-4 in the reverse direction.

The above examples are only illustrative and not meant to be limiting. For example, the same concepts may be extended to compute other FFT lengths than the ones described above. For example, in the case where the supported FFT lengths include 16, 32, 64, 128, and 256, all the FFT stages (e.g., stages 501, 502, 503, and 504) are implemented to selectively switch between radix-2 and radix-4 operations.

In an alternate implementation of architecture 500, radix 2 is used for the first stage 501 of the forward FFT, and radix 4 is used for all of the following stages. The reverse FFT would then start with radix 4 and have a final radix-2 stage. In this implementation, the twiddle memories may have the same content as the ones described for the implementation above (i.e., the implementation with the forward radix-4 stages followed by radix-2 final stage in the forward direction), but the twiddle addressing is different and the forward FFT would then use the larger twiddle tables.

FIG. 6 is a flowchart of a process 600 for performing Fast Fourier Transform (FFT) operations in bidirectional circuitry according to some embodiments. Process 600 can be performed in bidirectional circuitry such as bidirectional DIF architecture 300 of FIG. 3 and/or bidirectional DIF architecture 500 of FIG. 5.

Step 602 involves computing a selectable one of a forward FFT operation and a reverse FFT operation using cascaded stages in the bidirectional circuitry. For example, step 602 may involve computing a selectable one of, a forward decimation-in-frequency (DFT) FFT operation in a forward direction from an $i^{th}$ stage to a $j^{th}$ stage of the cascaded stages, and a reverse DFT FFT operation in a reverse direction from the $j^{th}$ stage to the $i^{th}$ stage of the cascaded stages.

Step 604 involves receiving, via a first input of the bidirectional circuitry, first data for processing in the cascaded stages in the forward direction according to the forward DFT FFT operation. The first input may be selectively coupled to an input of the $i^{th}$ stage of the plurality of cascaded stages.

Step 606 involves receiving, via a second input of the bidirectional circuitry, second data for processing in the cascaded stages in the reverse direction according to the reverse DFT FFT operation. The second input may be selectively coupled to an input of the $i^{th}$ stage of the cascaded stages.

One advantage for the systems and methods described herein is a reduction in usage of logic and/or memory resources. By using a DIF structure instead of a decimation-in-time (DIT) structure, the logic resources can be reduced significantly, by 30% to 50% in some embodiments. Also, by using a DIF structure, a bidirectional forward/reverse FFT operation can be used, avoiding the need to instantiate a second block that is dedicated for the reverse FFT operation.

One application of the systems and methods discussed herein is frequency domain filtering, where an input stream is converted to the frequency domain using the forward FFT, a mask is applied to the transformed data, and a reverse FFT is performed with the same structure to convert back to time domain. For example, the disclosed systems and methods may be used for streaming FFTs, where there is a continuous data input and a continuous data output. The reduction of time and resource usage in employing the disclosed bidirectional DIF FFT architectures may significantly increase performance of such applications. The systems and methods discussed herein can be applied to pure radix FFT operations (such as radix 4), which can calculate an FFT with length equal to any power of 4, or mixed-radix operations (such as radix 4/2), which can calculate an FFT with length equal to any power of 2. The length of the FFT can also be made variable, e.g., so that any length of FFT smaller than the core size can be calculated. In some implementations, the length of FFT supported may be limited to length $4^x$ for the radix-4 FFT and length $2^x$ for the mixed radix 4/2 FFTs.

In some implementations, the systems and methods described herein can be used to calculate both forward FFT and reverse FFT operations by cascading existing implementations of individual FFT stages, according to the architectures described herein. The architectures described herein may thus leverage known implementations of individual FFT stages to create a bidirectional streaming forward and reverse FFT application that is both size-efficient and performance-efficient. For example, the disclosed architectures may make use of a known stage-level FFT implementation that calculates an IFFT by computing the complex conjugate of the input and of the output of the FFT, and by dividing by the length of the FFT.

One advantage for supporting both normal order and radix reversed order for input data in DIF FFT operations is the ability to leverage a highly optimized architecture for a floating-point FFT which exists for a forward DIF FFT operation. This floating-point implementation was described in commonly-assigned U.S. patent application Ser. No. 12/715,711, filed Mar. 2, 2010, entitled "DISCRETE FOURIER TRANSFORM IN AN INTEGRATED CIRCUIT DEVICE," which is hereby incorporated by reference.

Instructions for carrying out a method according to this invention for programming a programmable device to perform DFTs may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 7:
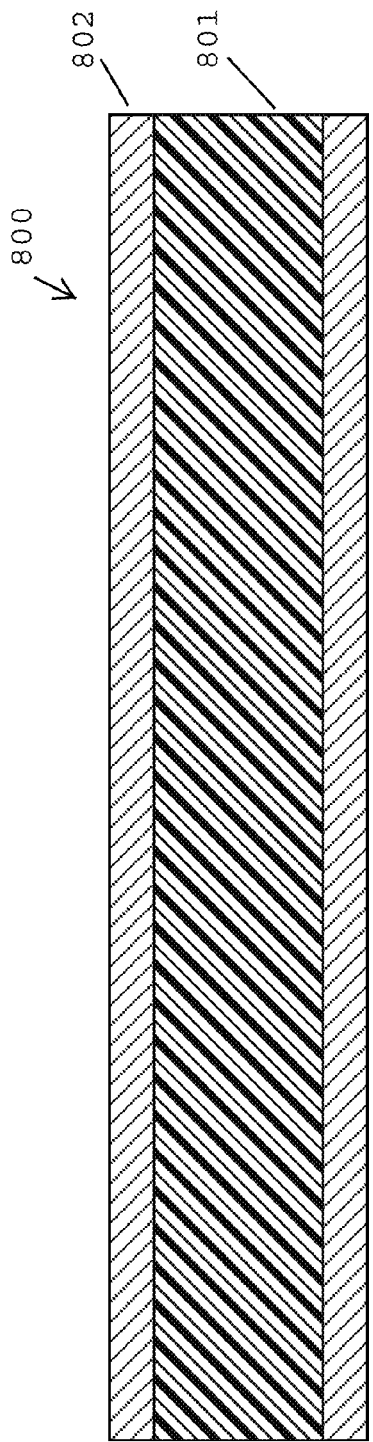
FIG. 7 is a cross-sectional view of a magnetic data storage medium encoded with a set of machine-executable instructions for performing the method according to the present invention.

FIG. 7 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 8:
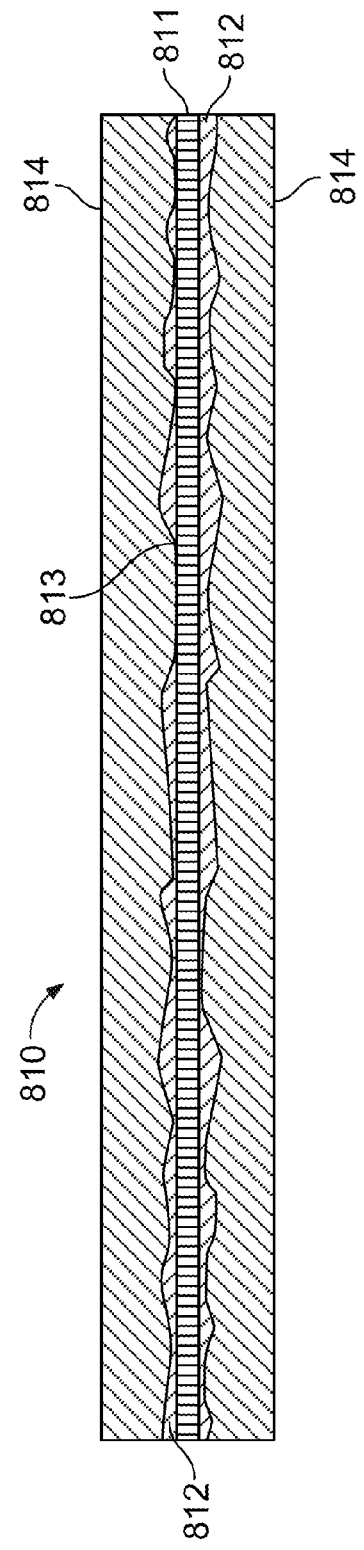
FIG. 8 is a cross-sectional view of an optically readable data storage medium encoded with a set of machine executable instructions for performing the method according to the present invention.

FIG. 8 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 9:
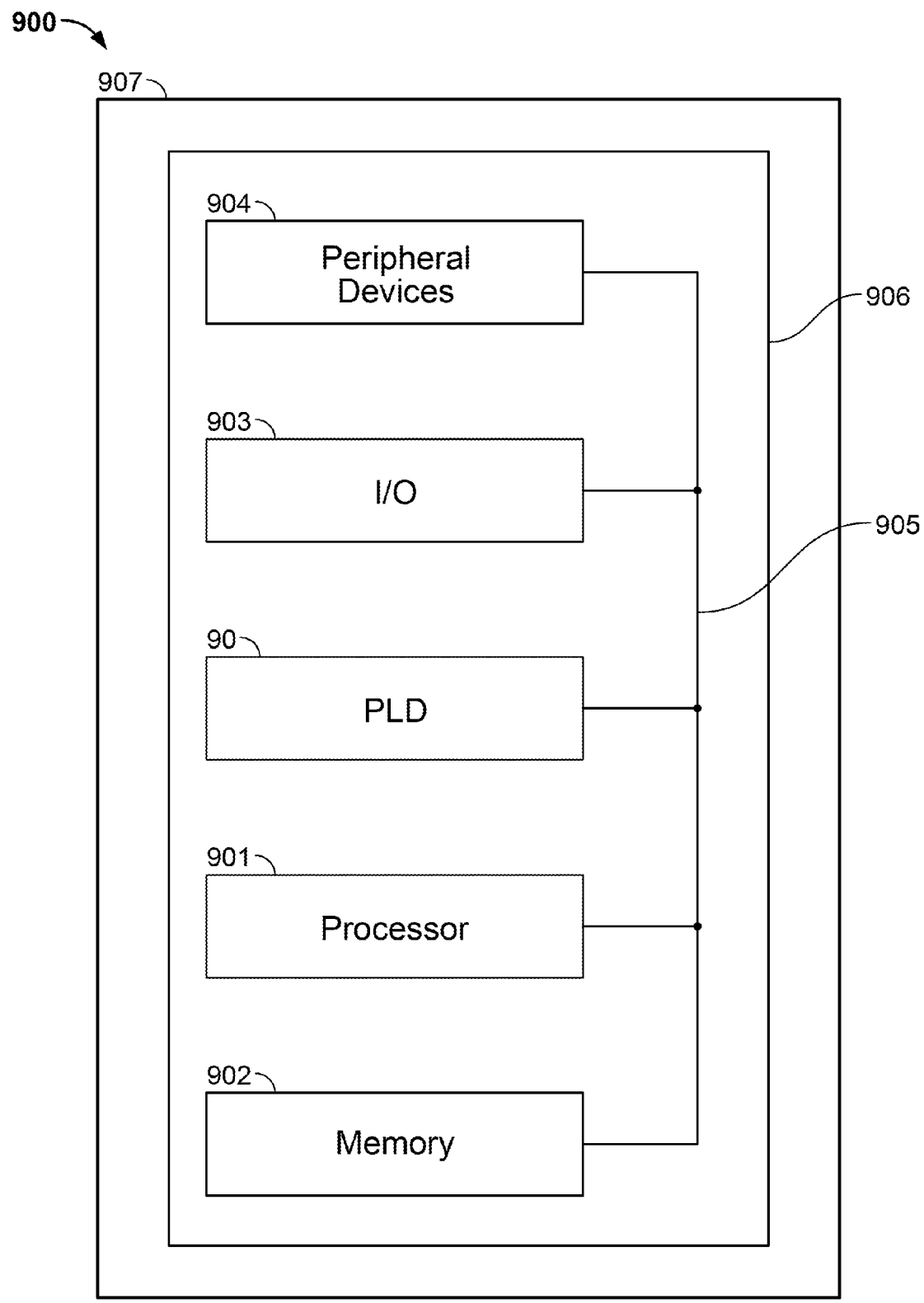
FIG. 9 is a simplified block diagram of an illustrative system employing a programmable logic device incorporating the present invention.

A PLD 90 programmed according to the present invention may be used in many kinds of electronic devices. One possible use is in a data processing system 900 shown in FIG. 9. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Bidirectional circuitry for performing Fast Fourier Transform (FFT) operations, said circuitry comprising:
    a plurality of cascaded stages for computing a selectable one of,
        a forward decimation-in-frequency (DFT) FFT operation in a forward direction from an $i^{th}$ stage to a $j^{th}$ stage of the plurality of cascaded stages, and
        a reverse DFT FFT operation in a reverse direction from the $j^{th}$ stage to the $i^{th}$ stage of the plurality of cascaded stages;
    a first input for receiving first data for processing in the plurality of cascaded stages in the forward direction according to the forward DFT FFT operation, the first input being selectively coupled to an input of the $i^{th}$ stage of the plurality of cascaded stages; and
    a second input for receiving second data for processing in the plurality of cascaded stages in the reverse direction according to the reverse DFT FFT operation, the second input being selectively coupled to an input of the $j^{th}$ stage of the plurality of cascaded stages.

2. The circuitry of claim 1, wherein the plurality of cascaded stages comprises a plurality of stages serially coupled via respective selection circuitries, wherein:
    $i^{th}$ an stage of the plurality of stages has an input coupled to an output of a first selection circuitry, the first selection circuitry having a first input coupled to the first input for receiving the first data, and a second input coupled to an output of a $(i+1)^{th}$ stage of the plurality of stages.

3. The circuitry of claim 2, wherein:
    an $(i+1)^{th}$ stage of the plurality of stages has an input coupled to an output of a second selection circuitry, the second selection circuitry having a first input coupled to an output of the $i^{th}$ stage, and a second input coupled to an output of a $(i+2)^{th}$ stage of the plurality of stages; and
    the $j^{th}$ stage of the plurality of stages has an input coupled to an output of a third selection circuitry, the third selection circuitry having a first input coupled to the second input for receiving the second data, and a second input coupled to an output of a $(j-1)^{th}$ stage,
    wherein the $(i+2)^{th}$ stage and the $(j-1)^{th}$ stage are the same stage.

4. The circuitry of claim 1, further comprising a plurality of twiddle stage generators, wherein each twiddle stage generator of the plurality of twiddle stage generators is configured to generate a respective plurality of twiddle factors corresponding to a respective FFT stage, the each twiddle stage generator being coupled to a respective stage of the plurality of cascaded stages in the forward direction and another respective stage of the plurality of cascaded stages in the reverse direction.

5. The circuitry of claim 4, wherein a twiddle stage generator of the plurality of twiddle stage generators is configured to:
    provide $i^{th}$ stage twiddle factors to the $i^{th}$ stage of the plurality of cascaded stages in response to the first data being processed in the forward direction according to the forward DFT FFT operation;
    provide the $i^{th}$ stage twiddle factors to the $j^{th}$ stage of the plurality of cascaded stages in response to the second data being processed in the reverse direction according to the reverse DFT FFT operation.

6. The circuitry of claim 5, wherein the twiddle stage generator is configured to generate the $i^{th}$ stage twiddle factors in digit-reversed order in response to the second data being processed according to the reverse DFT FFT operation in the reverse direction.

7. The circuitry of claim 5, wherein the forward DFT FFT operation and the reverse DFT FFT operation are mixed radix FFT operations, and wherein the twiddle stage generator is configured to:
    generate the $i^{th}$ stage twiddle factors to the $i^{th}$ stage of the plurality of cascaded stages based on a first twiddle stride in response to the first data being processed in the forward direction according to the forward DFT FFT operation; and
    generate the $i^{th}$ stage twiddle factors to the $j^{th}$ stage of the plurality of cascaded stages based on a second twiddle stride in response to the second data being processed in the reverse direction according to the reverse DFT FFT operation, wherein the first twiddle stride is a multiple of the second twiddle stride.

8. The circuitry of claim 1, wherein the forward DFT FFT operation and the reverse DFT FFT operation are mixed radix FFT operations, and wherein:
    the first data is processed according to the forward DFT FFT operation through a series of radix-4 stages followed by a radix-2 stage;
    the second data is processed according to the reverse DFT FFT operation through a series of radix-4 stages followed by a radix-2 stage; and
    the $i^{th}$ stage is a radix-4 stage in the forward direction and a radix-2 stage in the reverse direction.

9. The circuitry of claim 8, further comprising a twiddle stage generator, wherein:
    the twiddle stage generator is configured to provide a plurality of twiddle factors to a selectable one of a stage of the plurality of cascaded stages in the forward direction or another stage of the plurality of cascaded stages in the reverse direction; and
    a first twiddle stride of the plurality of twiddle factors provided in the backward direction is half that of a second twiddle stride of the plurality of twiddle factors provided in the forward direction.

10. The circuitry of claim 1, wherein the forward DFT FFT operation and the reverse DFT FFT operation are mixed radix FFT operations, and wherein the plurality of cascaded stages comprises a radix-2 stage followed by a series of radix-4 stages.

11. A method of performing Fast Fourier Transform (FFT) operations in bidirectional circuitry, said method comprising:
    computing, using a plurality of cascaded stages in the bidirectional circuitry, a selectable one of, a forward decimation-in-frequency (DFT) FFT operation in a forward direction from an $i^{th}$ stage to a $i^{th}$ stage of the plurality of cascaded stages, and a reverse DFT FFT operation in a reverse direction from the $j^{th}$ stage to the $i^{th}$ stage of the plurality of cascaded stages;

receiving, via a first input of said bidirectional circuitry, first data for processing in the plurality of cascaded stages in the forward direction according to the forward DFT FFT operation, the first input being selectively coupled to an input of the $i^{th}$ stage of the plurality of cascaded stages; and receiving, via a second input of said bidirectional circuitry, second data for processing in the plurality of cascaded stages in the reverse direction according to the reverse DFT FFT operation, the second input being selectively coupled to an input of the $j^{th}$ stage of the plurality of cascaded stages.

12. The method of claim 11, wherein the plurality of cascaded stages comprises a plurality of stages serially coupled via respective selection circuitries, wherein:

an $i^{th}$ stage of the plurality of stages has an input coupled to an output of a first selection circuitry, the first selection circuitry having a first input coupled to the first input for receiving the first data, and a second input coupled to an output of a $(i+1)^{th}$ stage of the plurality of stages.

13. The method of claim 12, wherein:

an $(i+1)^{th}$ stage of the plurality of stages has an input coupled to an output of a second selection circuitry, the second selection circuitry having a first input coupled to an output of the $i^{th}$ stage, and a second input coupled to an output of a $(i+2)^{th}$ stage of the plurality of stages; and the $j^{th}$ stage of the plurality of stages has an input coupled to an output of a third selection circuitry, the third selection circuitry having a first input coupled to the second input for receiving the second data, and a second input coupled to an output of a $(j-1)^{th}$ stage, wherein the $(i+2)^{th}$ stage and the $(j-1)^{th}$ stage are the same stage.

14. The method of claim 11, wherein said bidirectional circuitry comprises a plurality of twiddle stage generators, the method further comprising generating using each twiddle stage generator of the plurality of twiddle stage generators a respective plurality of twiddle factors corresponding to a respective FFT stage, the each twiddle stage generator being coupled to a respective stage of the plurality of cascaded stages in the forward direction and another respective stage of the plurality of cascaded stages in the reverse direction.

15. The method of claim 14, further comprising:

providing, using a twiddle stage generator, $i^{th}$ stage twiddle factors to the $i^{th}$ stage of the plurality of cascaded stages in response to the first data being processed in the forward direction according to the forward DFT FFT operation;

providing, using the twiddle stage generator, the $i^{th}$ stage twiddle factors to the $j^{th}$ stage of the plurality of cascaded stages in response to the second data being processed in the reverse direction according to the reverse DFT FFT operation.

16. The method of claim 15, further comprising generating, using the twiddle stage generator, the $i^{th}$ stage twiddle factors in digit-reversed order in response to the second data being processed according to the reverse DFT FFT operation in the reverse direction.

17. The method of claim 15, wherein the forward DFT FFT operation and the reverse DFT FFT operation are mixed radix FFT operations, the method further comprising:

generating, using the twiddle stage generator, the $i^{th}$ stage twiddle factors to the $i^{th}$ stage of the plurality of cascaded stages based on a first twiddle stride in response to the first data being processed in the forward direction according to the forward DFT FFT operation; and generating, using the twiddle stage generator, the $i^{th}$ stage twiddle factors to the $j^{th}$ stage of the plurality of cascaded stages based on a second twiddle stride in response to the second data being processed in the reverse direction according to the reverse DFT FFT operation, wherein the first twiddle stride is a multiple of the second twiddle stride.

18. The method of claim 11, wherein the forward DFT FFT operation and the reverse DFT FFT operation are mixed radix FFT operations, the method further comprising:

processing the first data according to the forward DFT FFT operation through a series of radix-4 stages followed by a radix-2 stage; and processing the second data according to the reverse DFT FFT operation through a series of radix-4 stages followed by a radix-2 stage, wherein the $i^{th}$ stage is a radix-4 stage in the forward direction and a radix-2 stage in the reverse direction.

19. The method of claim 18, the method further comprising:

providing, using a twiddle stage generator, a plurality of twiddle factors to a selectable one of a stage of the plurality of cascaded stages in the forward direction or another stage of the plurality of cascaded stages in the reverse direction; and providing a first twiddle stride of the plurality of twiddle factors in the backward direction that is half that of a second twiddle stride of the plurality of twiddle factors provided in the forward direction.

20. The method of claim 11, wherein the forward DFT FFT operation and the reverse DFT FFT operation are mixed radix FFT operations, and wherein the plurality of cascaded stages comprises a radix-2 stage followed by a series of radix-4 stages.

21. A non-transient machine-readable data storage medium encoded with machine-executable instructions for configuring a programmable integrated circuit device as bidirectional circuitry for performing Fast Fourier Transform (FFT) operations, said instructions comprising:

instructions to configure logic of said programmable integrated circuit device as a plurality of cascaded stages for computing a selectable one of, a forward decimation-in-frequency (DFT) FFT operation in a forward direction from an $i^{th}$ stage to a $i^{th}$ stage of the plurality of cascaded stages, and a reverse DFT FFT operation in a reverse direction from the $j^{th}$ stage to the $i^{th}$ stage of the plurality of cascaded stages;

instructions to configure a first input of said programmable integrated circuit device for receiving first data for processing in the plurality of cascaded stages in the forward direction according to the forward DFT FFT operation, the first input being selectively coupled to an input of the $i^{th}$ stage of the plurality of cascaded stages; and instructions to configure a second input of said programmable integrated circuit device for receiving second data for processing in the plurality of cascaded stages in the reverse direction according to the reverse DFT FFT operation, the second input being selectively coupled to an input of the $j^{th}$ stage of the plurality of cascaded stages.

22. The non-transient machine-readable data storage medium of claim 21, wherein said instructions to configure logic of said programmable integrated circuit device as a plurality of cascaded stages comprises instructions to configure logic of said programmable integrated circuit device as a plurality of stages serially coupled via respective selection circuitries, wherein:

an $i^{th}$ stage of the plurality of stages has an input coupled to an output of a first selection circuitry, the first selection circuitry having a first input coupled to the first input for receiving the first data, and a second input coupled to an output of a $(i+1)^{th}$ stage of the plurality of stages.

23. The non-transient machine-readable data storage medium of claim 21, further comprising instructions to configure logic of said programmable integrated circuit device as a plurality of twiddle stage generators, wherein each twiddle stage generator of the plurality of twiddle stage generators is configured to generate a respective plurality of twiddle factors corresponding to a respective FFT stage, the each twiddle stage generator being coupled to a respective stage of the plurality of cascaded stages in the forward direction and another respective stage of the plurality of cascaded stages in the reverse direction.

\* \* \* \* \*